Patented Nov. 18, 1947

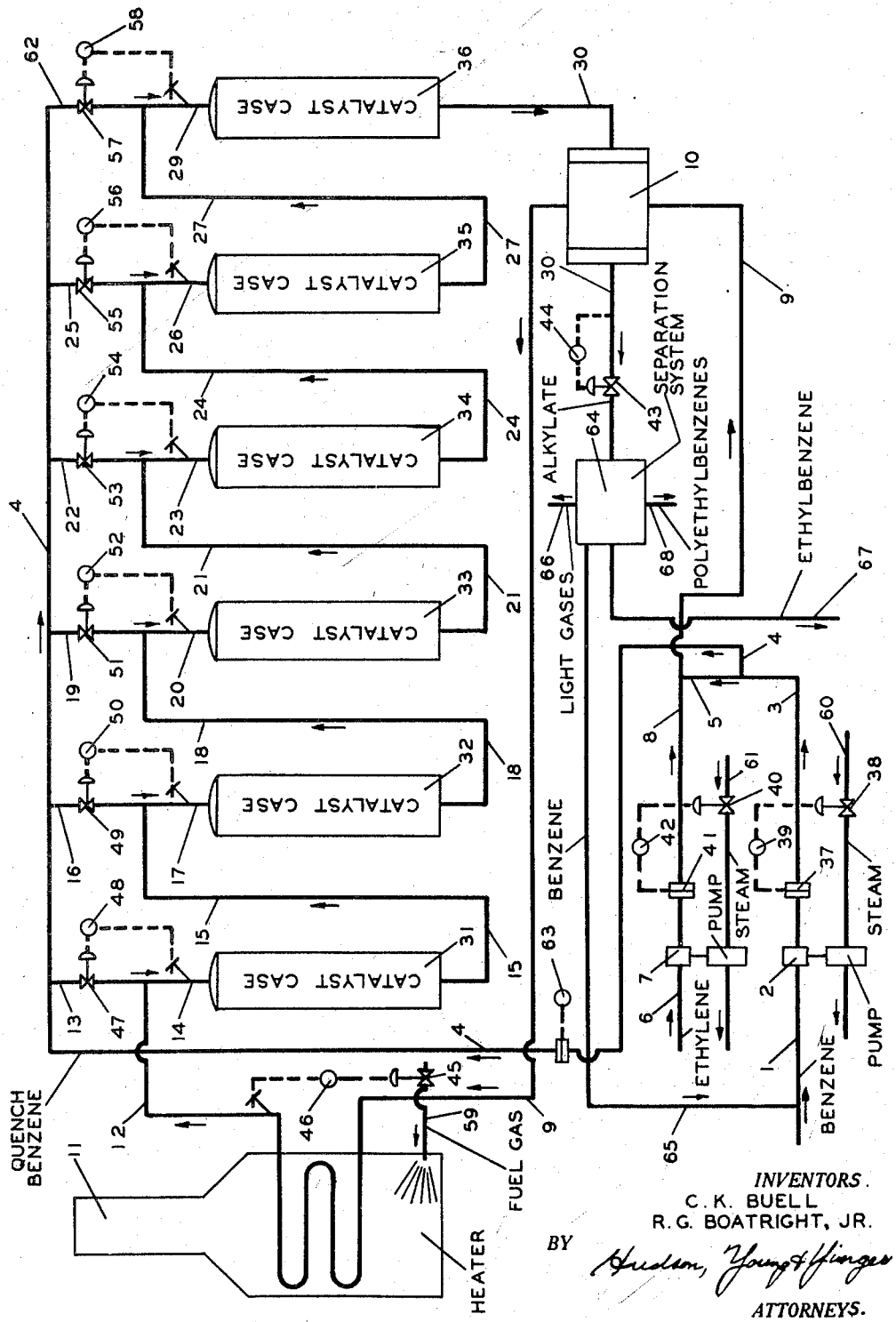

2,431,166

UNITED STATES PATENT OFFICE 2,431,166

CATALYTIC ALKYLATION OF HYDROCARBONS

Charles Keith Buell and Robert Guy Boatright, Jr., Bartlesville, Okla., assignors to Phillips Petroleum Company, a corporation of Delaware Application April 5, 1943, Serial No. 481,916

5 Claims. (Cl. 260—671)

This invention relates to the alkylation of hydrocarbons. The invention particularly relates to a method for controlling the reaction conditions in a catalytic alkylation process. In a specific modification this invention relates to a method for controlling the reaction conditions in a process wherein benzene and ethylene are alkylated to ethylbenzene in a series of catalyst cases containing a solid type catalyst.

The invention has application broadly to the alkylation of organic compounds, such as hydrocarbons, aromatic oxygenated compounds such as phenols, etc., particularly aromatic hydrocarbons such as benzene, with olefins or other alkylating reactants, including alcohols, alkyl halides, etc. Numerous catalysts known to the art may be utilized, the choice being made on a basis of the reaction being effected, desired yields of various products, and other factors affecting the operation and economics of the process in question. Such catalysts may at times, be gaseous liquid, or solid, and merely as examples may be mentioned boron fluoride and various organic and inorganic complexes thereof, hydrogen fluoride, sulfuric acid, phosphoric acid, aluminum chloride and other metal halides of the Friedel-Crafts type, and solid adsorptive contact catalysts such as clays, for example acid-washed bentonite, synthetic silica gels activated with various metal oxides, for example silica-alumina, silica-zirconia, etc., and other solid catalysts known generally as synthetic silica-alumina type catalysts. It will be understood that these catalysts are not necessarily equivalents for all reactions, some being more advantageously utilized in one particular conversion, while others may be more suited for a different conversion.

A preferred embodiment of the present invention involves the alkylation of benzene with low-boiling olefins over a mass of solid granular contact-type catalysts, especially synthetic silica-alumina type catalysts, whereby high yields of mono-alkl benzenes are obtained through the selective action of the catalyst and the careful control of reaction conditions made possible by the invention. Accordingly, our invention will be described with particular reference to the alkylation of benzene with ethylene. Preferred catalysts for this reaction are those comprising silica and one or more oxides of metals of group IIIB or IVA of the periodic system, particularly alumina, india, or thallia from group IIIB or titania, zirconia, or thoria from group IVA, preferably in the form of synthetic precipitated silica gel promoted by relatively minor proportions of the metal oxide. Such synthetic catalysts are generally prepared by first forming a hydrous silica gel or jelly from an alkali-silicate and an acid, washing soluble material from the gel, treating or activating the gel with an aqueous solution of one or more suitable metal salts, whereby a hydrous metal oxide is formed on the silica gel, probably by hydrolysis, and subsequently washing and drying the treated material.

The alkylation of benzene with ethlene and other alklation reactions are highly exothermic. The type of product and yields obtained are relatively sensitive to the temperature which prevails in the catalyst zone during conversion. It has heretofore been difficult to control said temperature, and accordingly the product and yields, because of the exothermic nature of the reaction, which tends to cause undesired temperature rise in the reaction zone. Conventional means of cooling, for example, by indirect heat exchange in the reaction zone, have disadvantages in that complete efficiency is impossible of attainment, and additional expensive equipment is required. Furthermore, it is difficult to obtain the delicacy of control which is so desirable for optimum yields of desired products.

One object of our invention is to alkylate organic compounds. An object of our invention is to provide an improved process of hydrocarbon alkylation. Another object is to provide a method for removing exothermic heat of reaction in such process. A further object is to provide simple means for controlling extent of reaction at all points in an alkylation reaction system. Still another object is to effect the alkylation of benzene with low-boiling olefins, utilizing a solid catalyst in a manner ensuring high yields of mono-alkyl benzene. Yet another object is to produce ethylbenzene by catalytic alkylation of benzene with ethylene, in a process wherein ethylene passed to the reaction is substantially completely utilized. Further objects and advantages of the invention will be apparent from the accompanying disclosure and discussion.

In a preferred modification of our invention, benzene and ethylene are mixed in suitable molar ratio and pumped at reaction pressure through a heater wherein the mixture is raised to reaction temperature. The mixture is then passed through a series of catalyst chambers at a flow rate chosen to give the desired conversion of ethylene. In order to avoid excessive reaction a portion of cold benzene is by-passed around the heater and injected into the main stream between each chamber, thus absorbing the heat of reaction and minimizing the concentration of products in the reaction mixture.

In designing the catalyst cases and auxiliary equipment in a catalytic alkylation plant to manufacture ethylbenzene from benzene and ethylene, the variables that must be controlled to obtain optimum reaction conditions are principally temperature, pressure, concentration of reactants and space velocity. Space velocity, as used herein, is defined as liquid volumes of feed per volume of catalyst per hour.

The number of catalyst cases required for a given quantity of benzene plus ethylene feed is determined by the catalyst capacity of the individual catalyst case and the desired space velocity. The optimum catalyst case size or capacity is determined primarily by four factors—allowable rise of temperature in the catalyst case due to the exothermic heat of reaction, pressure drop, channeling of catalyst by feed stock as it passes through the catalyst bed, and construction problems. The maximum depth of the catalyst bed is determined by the pressure drop that can be tolerated while the maximum diameter is determined from a consideration of the amount of channeling that will occur; constructional limitations must also be taken into consideration. The quantity of feed, optimum catalyst case size, and optimum space velocity in a commercial sized plant are usually such as to require the installation of more than one catalyst case, although a single, long case may, at times, be used.

As an example of the calculation of the number of catalyst cases required, assume the following data are given. The size chosen for the catalyst cases has been found by experience to be satisfactory from the standpoint of pressure drop, channeling, and convenience of construction, when using the particular catalyst described.

Length of catalyst case = 12.0'
Inside diameter of catalyst case = 30"
Depth of catalyst bed in catalyst case = 10.0' or 120"
Size of catalyst particles = 8 to 14 mesh
Space velocity = 1.8 volumes of feed per volume of catalyst per hour
Ethylene feed = 545 gallons per hour
Benzene feed = 3220 gallons per hour
Total feed = 3765 gallons per hour From the above data, the quantity of catalyst in a 30" diameter case packed to a depth of 10.0 feet is 49 cubic feet. This is equivalent to 366 gallons of catalyst per case. Then, by dividing the total gallons per hour of feed by the space velocity, we find that 2090 gallons of catalyst are required to give the desired flow rate, or space velocity, of 1.8 volumes of feed per volume of catalyst per hour. Since one case contains only 366 gallons of catalyst the number of cases that must be installed in order that the required volume of catalyst be available is found by dividing the total gallons of catalyst required (2090) by the capacity of each case (366 gallons). The number of cases required, therefore, is 5.7; six cases would be installed.

In order to favor the formation of monoethylbenzene over diethylbenzene and higher polyethylbenzenes in a catalytic alkylation process such as described herein, the ethylene concentration is kept low and the benzene concentration is kept high in the reaction zone. The molar ratio of benzene to ethylene is usually about 5:1, but may be as low as 2:1 or as high as 15:1 depending upon the desired yield of ethylbenzene in the final alkylate. As the reaction mixture passes through the system the concentration of mono- and polyethyl benzenes therein tends to increase due to their continuing formation, thus favoring alkylation thereof with ethylene. Addition of benzene at points in accordance with this invention keeps the concentration down, giving higher ultimate yields of the monoethylbenzene.

The operating variables of temperature, pressure, and space velocity may be varied over rather wide limits depending upon the desired per pass conversion of ethylene, efficiency of conversion of the reactants into ethylbenzene, and the activity of the particular catalyst used to effect the reaction. The alkylation reaction is highly exothermic and in order to avoid excessive reaction the heat generated in each catalyst case is removed by addition of cold benzene before the reactants are passed to the succeeding case. Our invention makes possible the control of reaction conditions within rather narrow limits to obtain a high efficiency in ethylene conversion, ethylbenzene production and utilization of process equipment. Using a synthetic silica alumina catalyst of precipitated granular silica gel activated by adsorbed alumina, we have found that the following operating conditions are satisfactory with respect to ethylene utilization and high production of ethylbenzene:

Temperature (catalyst inlet) _ 500–525° F.
Pressure (to ensure liquid or "dense" phase) _____ 900–1000 p. s. i. gauge.
Flow rate or space velocity___ One to two liquid volumes of feed per volume of catalyst per hour.

Of course, operating conditions may be found within wider limits if desired, the above values merely being representative of preferred conditions. It will be understood that with different reactants and/or catalysts the operating conditions may be quite different, their choice being within the skill of the art.

The accompanying drawing represents a preferred arrangement of equipment for practicing one embodiment of our invention, and the drawing and description thereof will serve to exemplify the invention further. Essentially pure liquid benzene in a quantity of 3220 gallons per hour enters the system described herein through conduit 1. By means of pump 2 the benzene is pressured to 1000 p. s. i. gauge and is discharged into conduit 3. The benzene flow rate is held constant by rate of flow controller 39, which controls the quantity of steam passed to pump 2 through conduit 60 and motor valve 38. The rate-of-flow controller is actuated by the differential pressure across an orifice plate in meter flange 37. Essentially pure liquid ethylene in a quantity of 545 gallons per hour enters the system through conduit 6 and by means of pump 7 is pressured to about 1000 p. s. i. gauge and discharged into conduit 8. The ethylene flow rate is held constant by rate of flow controller 42 which controls the quantity of steam passed to pump 7 through conduit 61 and motor valve 40. Rate of flow controller 42 is actuated by the differential pressure across an orifice plate in meter flange 41.

The 3220 gallons of benzene in conduit 3 is split into two portions. One portion of 1750 gallons passes through conduit 5 and is mixed in conduit 9 with the ethylene stream from conduit 8. The remaining portion of the benzene, 1470 gallons, passes through conduit 4 and flow meter 63 and serves as a quench stream between catalyst chambers as will be described below.

The benzene-ethylene mixture in conduit 9 passes through heat exchanger 10 and heater 11. In heater 11 the temperature of the mixture is raised to 500° F., or higher, depending upon the activity of the catalyst. It is then passed through conduits 12 and 14 to catalyst case 31. The temperature of the stream in conduit 12 is controlled and recorded by temperature controller and recorder 46. Controller 46 is actuated by a mercury bulb in conduit 12 and controls the quantity of fuel gas introduced to heater 11 through conduit 59 and motor valve 45.

The alkylation of ethylene and benzene is effected in a series of 30 inch by 12 foot catalyst chambers 31, 32, 33, 34, 35, and 36, each containing a 10 foot depth bed of synthetic silica-alumina granular catalyst. The catalyst cases are connected in series by means of conduits 15, 18, 21, 24, and 27. The desired average space velocity through the catalyst is 1.8 and the desired molar ratio of benzene to ethylene in the total feed to the catalyst is 4.75:1. The inlet feed temperature when using a new catalyst is controlled at about 500° F. and the pressure maintained at about 1000 p. s. i.; however, as the catalyst becomes spent the inlet temperature is slowly increased toward 525° F. to compensate for the loss in catalyst activity. When the activity of the catalyst becomes too low it is replaced. Since the total benzene plus ethylene feed is 3765 gallons per hour, 6 chambers are used as shown in the figure and calculated in the example previously given.

The 1470 gallons of cold benzene in conduit 4 is sufficient to remove the total heat of reaction, and is proportioned to each individual catalyst case depending upon the state of activity of the catalyst and extent of conversion in the preceding case. The portion of quench benzene introduced to each case through conduits 13, 16, 19, 22, 25, and 62 is automatically controlled by temperature controllers 48, 50, 52, 54, 56, and 58, respectively, which are adjusted to control the temperature of the total inlet stream to each catalyst case at the desired value. The temperature controllers, which also record the temperature, are actuated by mercury bulbs located in conduits 14, 17, 20, 23, 26, and 29, which conduits carry the total stream passing to each catalyst case. When the catalyst is fresh, the inlet temperature is controlled at 490° F. to 510° F. depending upon the conversion desired in each individual case. The outlet temperature of any one case varies somewhat depending upon the extent of reaction in that case and the quantity of quench benzene that has been added to the previous cases.

Since the motor valves 47, 49, 51, 53, 55, and 57 controlling the quantity of quench benzene to the catalyst cases offer less resistance to flow than the heat exchanger 10 and heater 11, the quantity of quench benzene required to maintain the desired catalyst inlet temperature automatically passes through conduit 4 and the remaining benzene is forced through conduit 9.

The outlet stream from the final catalyst case 36 is removed through conduit 30 and passed through heat exchanger 10 wherein it exchanges heat with the fresh feed in conduit 9. The pressure on the system is maintained by means of motor valve 43 operated by pressure controller and recorder 44 which is actuated by pressure variations in conduit 30. As the stream in conduit 30 passes through motor valve 43 its pressure is reduced and it is then passed to a separation system, indicated diagrammatically at 64, for the recovery of unconverted benzene which is recycled via conduit 65 to conduit 1, small amounts of light gases which are separated via conduit 66, ethylbenzene product which is removed through conduit 67, and smaller quantities of polyethyl benzenes which are separated via conduit 68.

When the system is operated in the manner described herein, about 90 to 95 per cent of the ethylene is reacted. The alkylate contains about 87 per cent monoethylbenzene, 11 per cent diethylbenzene and 2 per cent of higher polyethylbenzenes.

From the foregoing description and example it is apparent that among the many advantages of our invention is the fact that it provides a method for removing the exothermic heat of reaction as the alkylation reaction progresses through the catalyst bed and thereby minimizes the formation of secondary reaction products. Another advantage of our invention is the use of one of the reactant streams as a quenching medium. This eliminates any need of additional product separation steps which would be required if a "foreign" quench material were introduced into the system. Still another advantage is that an internal quench stream results in perfect heat exchange since the liquids exchanging heat are directly contacted. Not only would a tubular heat exchanger between cases, or inside the cases, result in less efficient heat exchange due to the necessary "temperature of approach" between the heat exchange media, but the additional high pressure equipment required would represent a considerable investment cost. A further advantage of our invention is that the extent of reaction in each catalyst case may be controlled by controlling the inlet temperature at any desired value. Furthermore, in the first few cases, where the molar ratio of benzene to ethylene is low, the space velocity is also low, and the longer contact time permits the use of lower average catalyst bed temperatures to obtain the desired conversion; a higher reaction efficiency results from the use of lower temperatures. On the other hand, as the reaction progresses, the introduction of quench benzene progressively increases the molar ratio of benzene to ethylene and of benzene to products and thereby further depresses the occurrence of undesirable side reactions, especially the formation of polyethylbenzenes.

Still other advantages will be apparent to one skilled in the art. For example, by suitable piping manifolding, the reactants may be introduced to the individual cases in any desired sequence if variations in catalyst activity should make this arrangement desirable. In certain instances changing the order of the catalyst cases will result in longer catalyst life. In other instances, particularly those in which greater flow rates than those given in the example are used, it may be desirable to arrange the cases in two or more parallel groups of several cases each in series to eliminate excessive pressure loss through the catalyst bed. Simplicity of operation is yet another advantage. It will be seen that rather than using several catalyst chambers with introduction of benzene between each for the purpose of cooling and of increasing the ratio of benzene to other materials in the stream, a single elongated catalyst chamber may be utilized, with introduction of the benzene at a plurality of points along its length. However, the use of several chambers is generally more desirable and effective in a commercial plant for the reasons hereinbefore enumerated. The term "reaction zone" as used herein may apply to one or more catalyst chambers as the case may be. Various other modifications and applications may be utilized without departing from the spirit and scope of the invention.

We claim:

1. A process for the synthesis of monoethyl benzene, which comprises passing a liquid mixture of benzene and ethylene in a molar ratio of at least 5:1 to one end of a long reaction zone, which contains a solid granular synthetic silica-alumina alkylation catalyst, at a superatmospheric pressure and an initial alkylation temperature between about 490 and about 510° F., adding at a plurality of points along the length of said reaction zone streams of olefin-free benzene at temperatures below the prevailing reaction temperature and such that the reaction temperature does not exceed about 525° F. and in amounts such as to maintain in the reacting mixture a high ratio of benzene to ethyl benzene such that the amount of monoethyl benzene in the final effluent is not less than about 87 per cent of the total reaction products, and recovering from effluents of said alkylation a fraction comprising monoethyl benzene so produced.

2. A process for the addition of a single ethyl group to an alkylatable aromatic hydrocarbon, which comprises passing a mixture comprising such an aromatic hydrocarbon and ethylene in a molar ratio of at least 2:1 to one end of a long alkylation zone, which contains a solid granular synthetic silica-alumina alkylation catalyst, at a superatmospheric pressure and an initial alkylation temperature between about 490 and about 525° F., adding at at least one point along the length of said reaction zone an olefin-free stream comprising said aromatic alkylatable hydrocarbon at a temperature sufficiently below the prevailing reaction temperature that the reaction temperature does not exceed about 525° F. and in an amount such as to maintain in said mixture a sufficiently high ratio of said aromatic hydrocarbon to the monoethyl derivative thereof to minimize effectively formation of polyethyl derivatives thereof, and recovering from effluents of said alkylation a fraction comprising a monoethyl derivative of said alkylatable aromatic hydrocarbon.

3. A process for the synthesis of monoethyl benzene, which comprises passing a mixture comprising benzene and ethylene to one end of an elongated alkylation zone which contains a mass of solid granular alkylation catalyst, the molar ratio of benzene to ethylene in said mixture being at least 2:1, maintaining the material in contact with said catalyst under alkylation conditions to form ethyl benzene, adding at at least one point along the length of said reaction zone an olefin-free benzene stream at a temperature sufficiently below the temperature of the mixture in contact with said catalyst immediately prior to said point as to compensate for heat of reaction and in an amount such as to maintain in said mixture a sufficiently high ratio of benzene to monoethyl benzene to minimize effectively formation of polyethyl benzenes, and recovering from effluents of said alkylation a fraction comprising monoethyl benzene so produced.

4. An improved process for the addition of a single ethyl group to benzene, which comprises passing a liquid mixture comprising benzene and ethylene in a molar ratio of at least about 2:1 to one end of a long alkylation zone containing a solid granular synthetic silica-alumina alkylation catalyst prepared by reacting an alkali silicate and an acid to form a silica gel, washing soluble material from said gel, activating said gel by treatment with an aqueous solution of a soluble aluminum salt to form a hydrous aluminum oxide on said silica gel and subsequently washing and drying the treated material, maintaining in said alkylation zone a superatmospheric pressure and maintaing at the inlet to said zone an initial alkylation temperature between about 490 and 525° F., adding at at least one point along the length of said reaction zone an olefin-free stream comprising benzene in an amount and at a temperature sufficiently below the prevailing reaction temperature that the resulting reaction temperature does not exceed about 525° F. and such as also to maintain in the resulting mixture a sufficiently high ratio of benzene to monoethyl benzene to minimize effectively formation of polyethyl benzenes, and recovering from effluents of said alkylation zone a fraction comprising monoethyl benzene so produced.

5. A process for the synthesis of a monoethyl derivative of an alkylatable hydrocarbon, which comprises passing a mixture comprising such an aromatic hydrocarbon and ethylene in a molar ratio of at least about 2:1 to one end of a long alkylation zone containing a solid granular alkylation catalyst, maintaining alkylation conditions in said alkylation zone such that said ethylene and said alkylatable hydrocarbon react to form a monoethyl derivative of said alkylatable hydrocarbon, adding at at least one point along the length of said alkylation zone an olefin-free stream comprising additional amounts of said alkylatable hydrocarbon in an amount and at a temperature sufficiently below the temperature of the mixture in contact with said catalyst immediately prior to said point of addition such that the reaction temperature of the resulting mixture does not exceed a desired maximum and such as to maintain in said mixture a sufficiently high ratio of said aromatic hydrocarbon to the monoethyl derivative thereof to minimize effectively formation of polyethyl derivatives thereof, and recovering from effluents of said alkylation zone a fraction comprising a monoethyl derivative of said alkylatable aromatic hydrocarbon so produced.

CHARLES KEITH BUELL.
ROBERT GUY BOATRIGHT, Jr.

REFERENCES CITED

The following references are of record in the file of this patent:

UNITED STATES PATENTS

| Number | Name | Date |
|---|---|---|
| 2,215,305 | Voorhies, Jr. | Sept. 17, 1940 |
| 2,256,450 | Goldsby et al. | Sept. 16, 1941 |
| 2,313,054 | De Simo et al. | Mar. 9, 1943 |
| 2,290,211 | Schaad | July 21, 1942 |

FOREIGN PATENTS

| Number | Country | Date |
|---|---|---|
| 451,788 | Great Britain | Aug. 12, 1936 |
| 464,752 | Great Britain | Apr. 19, 1937 |

OTHER REFERENCES

"Ethyl Benzene—Outlet," (2 pages), Oil and Gas Jour. (Aug. 6, 1942), pages 14 and 15. Photostat in 260–671.

Egloff, "Reactions of Pure Hydrocarbons," page 514 (one page). Published Reinhold Pub. Corp. (1937). Copy in Division 31.